(12) United States Patent
Reichow et al.

(10) Patent No.: US 9,855,849 B2
(45) Date of Patent: Jan. 2, 2018

(54) ON-BOARD POWER SYSTEM FOR A VEHICLE

(71) Applicant: Continental Automotive GmbH, Hannover (DE)

(72) Inventors: Dirk Reichow, Wenzenbach (DE); Markus Gilch, Mauern (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 757 days.

(21) Appl. No.: 14/373,795

(22) PCT Filed: Feb. 26, 2013

(86) PCT No.: PCT/EP2013/053837
§ 371 (c)(1),
(2) Date: Jul. 22, 2014

(87) PCT Pub. No.: WO2013/131783
PCT Pub. Date: Sep. 12, 2013

(65) Prior Publication Data
US 2015/0115707 A1    Apr. 30, 2015

(30) Foreign Application Priority Data

Mar. 6, 2012    (DE) .................. 10 2012 203 467

(51) Int. Cl.
*B60L 1/00*    (2006.01)
*B60L 3/00*    (2006.01)
(Continued)

(52) U.S. Cl.
CPC ........... *B60L 11/18* (2013.01); *B60L 11/1868* (2013.01); *H02J 1/00* (2013.01); *H02J 7/1423* (2013.01);
(Continued)

(58) Field of Classification Search
CPC ......... B60L 11/18; B60L 11/1868; H02J 1/00; H02J 2001/008; H02J 7/1423; Y02T 10/7011; Y02T 10/7066
(Continued)

(56) References Cited

U.S. PATENT DOCUMENTS 5,847,941 A    12/1998    Taguchi et al. ............ 363/21.03
6,323,608 B1    11/2001    Ozawa ........................... 318/139
(Continued)

FOREIGN PATENT DOCUMENTS

CN    101010863 A    8/2007    ............... H02H 9/04
CN    101163617 A    4/2008    ............... B60K 6/48
(Continued)

OTHER PUBLICATIONS

Chinese Office Action, Application No. 201380012828.2, 13 pages, dated Dec. 15, 2015.
(Continued)

Primary Examiner — Rexford Barnie
Assistant Examiner — Toan Vu
(74) Attorney, Agent, or Firm — Slayden Grubert Beard PLLC (57) ABSTRACT

An on-board power system for a vehicle includes a first on-board power system branch with a first operating voltage $U_1$, a first energy accumulator, and a first electrical consumer; a second on-board power system branch with a second operating voltage $U_2$ and a second energy accumulator; and a third on-board power system branch with a third operating voltage $U_3$ and a third electrical consumer. The on-board power system also includes a DC/DC converter configured to transmit energy bidirectionally at least between the first on-board power system branch and the second on-board power system branch. The on-board power system also includes a switching device configured to selec-
(Continued)

tively connect the first energy accumulator and the second energy accumulator to one another in series via in such a way that the third operating voltage $U_3$ can be made available by the first operating voltage $U_1$ and the second operating voltage $U_2$ together.

14 Claims, 4 Drawing Sheets

(51) Int. Cl.
*H02G 3/00* (2006.01)
*B60L 11/18* (2006.01)
*H02J 7/14* (2006.01)
*H02J 1/00* (2006.01)

(52) U.S. Cl.
CPC ...... *H02J 2001/008* (2013.01); *Y02T 10/7011* (2013.01); *Y02T 10/7066* (2013.01)

(58) Field of Classification Search
USPC .......................................................... 307/77
See application file for complete search history.

(56) References Cited

U.S. PATENT DOCUMENTS

| | | | |
|---|---|---|---|
| 6,982,499 B1 | 1/2006 | Kachi et al. | 307/75 |
| 7,180,205 B2 | 2/2007 | Wirdel et al. | 307/10.1 |
| 7,911,183 B2 | 3/2011 | Mizuno | 320/134 |
| 7,982,333 B2 | 7/2011 | Wolf et al. | 307/10.1 |
| 8,374,771 B2 | 2/2013 | Falkenstein | 701/105 |
| 8,492,922 B2 | 7/2013 | Mimatsu et al. | 307/9.1 |
| 2003/0043597 A1 | 3/2003 | Betts-lacroix | 363/16 |
| 2007/0216469 A1* | 9/2007 | Sakamoto | H03K 17/063 327/519 |
| 2008/0193832 A1* | 8/2008 | Doffin | H01M 2/1072 429/122 |
| 2013/0038120 A1* | 2/2013 | Mimatsu | B60L 11/1887 307/9.1 |

FOREIGN PATENT DOCUMENTS

| | | | |
|---|---|---|---|
| CN | 101238005 A | 8/2008 | B60L 11/18 |
| DE | 102009008255 A1 | 8/2010 | B60R 16/033 |
| EP | 2508387 A1 | 10/2012 | B60L 11/18 |
| JP | 11164494 A | 6/1999 | B60K 6/20 |
| JP | 2001136735 A | 5/2001 | B60L 11/12 |
| JP | 2002218667 A | 8/2002 | B60R 16/04 |
| JP | 2004507996 A | 3/2004 | B60K 6/28 |
| JP | 3616743 B2 | 2/2005 | B60L 11/18 |
| JP | 2006516500 A | 7/2006 | B60R 16/033 |
| JP | 2008091188 A | 4/2008 | H01M 10/44 |
| JP | 2011091884 A | 5/2011 | H01M 8/00 |
| WO | 2011/068003 A1 | 6/2011 | B60L 11/18 |
| WO | 2013/131783 A1 | 9/2013 | B60L 11/18 |

OTHER PUBLICATIONS

International Search Report and Written Opinion, Application No. PCT/EP2013/053837, 10 pages, dated Jul. 5, 2013.

* cited by examiner

ON-BOARD POWER SYSTEM FOR A VEHICLE

CROSS-REFERENCE TO RELATED APPLICATIONS

This application is a U.S. National Stage Application of International Application No. PCT/EP2013/053837 filed Feb. 26, 2013, which designates the United States of America, and claims priority to DE Application No. 10 2012 203 467.6 filed Mar. 6, 2012, the contents of which are hereby incorporated by reference in their entirety.

TECHNICAL FIELD

The application relates to an on-board power system for a vehicle and to a vehicle having an on-board power system.

BACKGROUND

DE 10 2009 008 255 A1 discloses a method for stabilizing an on-board energy system of a motor vehicle or a commercial vehicle. During operation of the method, a first voltage is applied to a first on-board power system branch, with a first energy store, a generator for supplying the first energy store and at least one first load being connected to the first on-board power system branch. A second voltage which is higher than the first voltage is applied to a second on-board power system branch, with a second energy store, a charging unit for supplying the second energy store, which is also coupled to the first on-board power system branch, and at least one second load being connected to the second on-board power system branch, the first and second energy stores being connected in series with one another in order to generate the second voltage. In order to control the output voltage and the output current of the charging unit, at least the first and second voltages are measured by a respective measuring element, from which a charging current for the second energy store is determined and generated. Finally, the measured first and/or second voltage(s) is/are conditioned using a non-linear element in such a manner that the charging unit charges the second energy store with increased energy withdrawal from the first on-board power system branch in the event of voltage rises of the first voltage and/or charges the second energy store with reduced energy withdrawal from the first on-board power system branch in the event of voltage dips of the first voltage.

SUMMARY

One embodiment provides an on-board power system for a vehicle, having a first on-board power system branch having a first operating voltage $U_1$, the first on-board power system branch having a first energy store and a first electrical load, a second on-board power system branch having a second operating voltage $U_2$, the second on-board power system branch having a second energy store, a third on-board power system branch having a third operating voltage $U_3$, the third on-board power system branch having a third electrical load, a DC/DC converter designed to bidirectionally transmit energy at least between the first on-board power system branch and the second on-board power system branch, and a first switching apparatus, the first energy store and the second energy store being able to be electrically connected in series with one another via the first switching apparatus in such a manner that the third operating voltage $U_3$ can be provided by the first operating voltage $U_1$ and the second operating voltage $U_2$ together.

In a further embodiment, $U_2 > U_1$.

In a further embodiment, the third on-board power system branch also include an electrical machine.

In a further embodiment, the on-board power system also includes a fourth on-board power system branch having a fourth operating voltage $U_4$, the fourth on-board power system branch having a fourth electrical load.

In a further embodiment, the fourth on-board power system branch also includes a third energy store.

In a further embodiment, the on-board further includes a second switching apparatus, the first on-board power system branch and the fourth on-board power system branch being able to be electrically coupled via the second switching apparatus.

In a further embodiment, the first energy store and the second energy store are able to be electrically connected in series with one another via the first switching apparatus and via the second switching apparatus.

In a further embodiment, the first on-board power system branch also include a starter of an internal combustion engine of the vehicle, and the fourth on-board power system branch also having a generator.

In a further embodiment, the first energy store, the second energy store, the third energy store, the DC/DC converter, the first switching apparatus and the second switching apparatus Re part of a control unit.

In a further embodiment, the first switching apparatus and/or the second switching apparatus are selected from the group consisting of a relay and a semiconductor switch.

In a further embodiment, the first energy store and the second energy store are in the form of a common device unit, in which case it is possible to make contact with the first energy store by means of two voltage taps inside the second energy store.

In a further embodiment, the third energy store and the second energy store are in the form of a common device unit, in which case it is possible to make contact with the third energy store by means of two voltage taps inside the second energy store.

In a further embodiment, the first energy store and the third energy store are in the form of a common device unit, in which case it is possible to make contact with the third energy store by means of a voltage tap inside the first energy store.

In a further embodiment, the generator and the electrical machine are in the form of a common device unit, in which case it is possible to make contact with the generator by means of a voltage tap of the electrical machine.

Another embodiment provides a hybrid electric vehicle having an on-board power system as disclosed above.

BRIEF DESCRIPTION OF THE DRAWINGS

Example embodiments of the invention are explained in more detail below with reference to the accompanying figures, in which.

DETAILED DESCRIPTION

Embodiments of the invention provide an on-board power system for a vehicle and a vehicle having an on-board power system which enable further improved voltage stabilization.

According to some embodiments, an on-board power system for a vehicle has a first on-board power system branch having a first operating voltage $U_1$, the first on-board power system branch having a first energy store and a first electrical load. The on-board power system also has a second on-board power system branch having a second operating voltage $U_2$, the second on-board power system branch having a second energy store. The on-board power system also has a third on-board power system branch having a third operating voltage $U_3$, the third on-board power system branch having a third electrical load. In addition, the on-board power system has a DC/DC converter designed to bidirectionally transmit energy at least between the first on-board power system branch and the second on-board power system branch. Furthermore, the on-board power system has a first switching apparatus. The first energy store and the second energy store are able to be electrically connected in series with one another via the first switching apparatus in such a manner that the third operating voltage $U_3$ can be provided by the first operating voltage $U_1$ and the second operating voltage $U_2$ together.

In one embodiment, the DC/DC converter is designed to bidirectionally transmit energy between the first on-board power system branch, the second on-board power system branch and the third on-board power system branch. Here and below, bidirectional transmission of energy between the first on-board power system branch, the second on-board power system branch and the third on-board power system branch is understood as meaning that electrical energy is transmitted from at least one of the three on-board power system branches mentioned to at least one of the two remaining on-board power system branches, in which case this applies to all of the on-board power system branches mentioned, that is to say energy can be interchanged between the on-board power system branches mentioned in any direction. In this case, energy can also be bidirectionally transmitted indirectly by means of the DC/DC converter, that is to say energy can be transmitted, by means of the DC/DC converter, to an on-board power system branch which is electrically connected to a further on-board power system branch, whereby energy is also transmitted to the further on-board power system branch.

The on-board power system may enable further improved voltage stabilization in different operating states of the vehicle. In this case, the voltage stabilization is enabled, in particular, by providing the bidirectional DC/DC converter, as explained in more detail below. Furthermore, the number of energy stores needed to provide the third operating voltage $U_3$ in addition to the first operating voltage $U_1$ and the second operating voltage $U_2$ can be advantageously reduced. This is effected by virtue of the third operating voltage $U_3$ being provided by the first operating voltage $U_1$ and the second operating voltage $U_2$ together. In this case, the first energy store, which provides the first operating voltage $U_1$, and the second energy store, which provides the second operating voltage $U_2$, together provide the third operating voltage $U_3$ if they are electrically connected in series with one another via the first switching apparatus. This dispenses with the provision of a separate energy store in the third on-board power system branch for the purpose of providing the third operating voltage $U_3$.

In one embodiment, the relationship $U_2 > U_1$ applies to the first operating voltage $U_1$ and the second operating voltage $U_2$. For example, $U_1$ is 12 V and $U_2$ is 36 V. As a result, a third operating voltage $U_3$ of 48 V can be provided when the first and second energy stores are connected in series.

The third on-board power system branch may also have an electrical machine, in particular a starter generator. The electrical machine may also be in the form of an electrical drive machine of the vehicle, in particular, that is to say, with appropriate operation, may provide an electric motor which forms a drive assembly for the vehicle.

In another embodiment, the on-board power system also has a fourth on-board power system branch having a fourth operating voltage $U_4$, the fourth on-board power system branch having a fourth electrical load. The fourth on-board power system branch may also have a third energy store. The fourth operating voltage $U_4$ preferably corresponds to the first operating voltage $U_1$, that is to say preferably $U_1 = U_4$. For example, the first operating voltage $U_1$ and the fourth operating voltage $U_4$ may each be 12 V.

In one embodiment, the on-board power system also has a second switching apparatus, the first on-board power system branch and the fourth on-board power system branch being able to be electrically coupled via the second switching apparatus. Here and below, the term "able to be electrically coupled" is understood as meaning that the respective electrically coupled components can be electrically connected to one another. As a result, in said embodiment, energy can be interchanged between the first on-board power system branch and the fourth on-board power system branch. This again advantageously enables further improved voltage stabilization during operation of the on-board power system.

In another embodiment, the first energy store and the second energy store are able to be electrically connected in series with one another via the first switching apparatus and via the second switching apparatus.

The first on-board power system branch may also have a starter of an internal combustion engine of the vehicle and/or a starter generator. The starter may be in the form of a pinion starter or a belt starter, in particular. Furthermore, the fourth on-board power system branch may also have a generator.

In one embodiment, the first energy store, the second energy store and preferably the third energy store as well as the DC/DC converter, the first switching apparatus and the second switching apparatus are part of a control unit. Said components can therefore be provided in a single module in the form of the control unit. In this case, the control unit preferably has four connections.

The on-board power system also preferably has a first drive unit, which is designed to drive the first switching apparatus, and a second drive unit, which is designed to drive the second switching apparatus, and a third drive unit which is designed to drive the DC/DC converter. In this case, in one refinement of the on-board power system, the first drive unit, the second drive unit and the third drive unit are part of the control unit.

The first switching apparatus and/or the second switching apparatus is/are preferably selected from the group consisting of a relay and a semiconductor switch, in particular a MOSFET switch. Therefore, the respective components of the on-board power system can be electrically coupled and disconnected in a simple and reliable manner via the corresponding switching apparatus.

In another embodiment, the DC/DC converter is in the form of a synchronous converter. Energy can therefore be transmitted between the first on-board power system branch, the second on-board power system branch and the third on-board power system branch and possibly the fourth on-board power system branch in a simple manner.

The first energy store, the second energy store and/or the third energy store is/are selected, for example, from the group consisting of at least one rechargeable battery, in particular at least one Li ion rechargeable battery or at least one lead acid rechargeable battery, and at least one capacitor, in particular at least one double-layer capacitor.

Furthermore, the first electrical load, the second electrical load and/or the fourth electrical load may be in the form of a dynamic high-current load.

In another embodiment of the on-board power system, the first energy store and the second energy store are in the form of a common device unit. In this case, it is possible to make contact with the first energy store by means of two voltage taps inside the second energy store. In this embodiment, the common device unit has four connections.

In another embodiment, the third energy store and the second energy store are in the form of a common device unit. In this case, it is possible to make contact with the third energy store by means of two voltage taps inside the second energy store. In this embodiment, the common device unit has four connections.

Furthermore, the first energy store and the third energy store may be in the form of a common device unit. In this embodiment, it is possible to make contact with the third energy store by means of a voltage tap inside the first energy store. In this embodiment, the common device unit has three connections.

Furthermore, the generator and the electrical machine may be in the form of a common device unit. In this case, it is possible to make contact with the generator by means of a voltage tap of the electrical machine.

Other embodiments provide a vehicle having an on-board power system according to one of the embodiments mentioned. The vehicle may be a hybrid electric vehicle, for example. For example, the vehicle may be in the form of a micro-hybrid or mild hybrid electric vehicle. In this case, a micro-hybrid electric vehicle is typically understood as meaning a vehicle in which the electric motor is not directly used to drive the vehicle, whereas, in a mild hybrid electric vehicle, the electric motor typically acts directly as a drive assembly of the vehicle. In this case, micro-hybrid electric vehicles have a specific power/weight ratio of the electric motor of typically approximately 2.7 to 4 kW/t. Mild hybrid electric vehicles have an electromotive power of typically approximately 6 to 14 kW/t.

The vehicle is, for example, a motor vehicle, in particular an automobile or a truck, and may also have a start/stop system which is designed to automatically and/or manually switch off or start an internal combustion engine of the vehicle.

The vehicle according to the application has the advantages which have already been mentioned in connection with the on-board power system according to the application and are not listed again at this juncture in order to avoid repetitions. For a vehicle with a start/stop system in particular, further improved voltage stabilization is particularly important since starting of the internal combustion engine signifies a high power consumption, which may result in voltage dips in the vehicle on-board power system.

Figure 1:
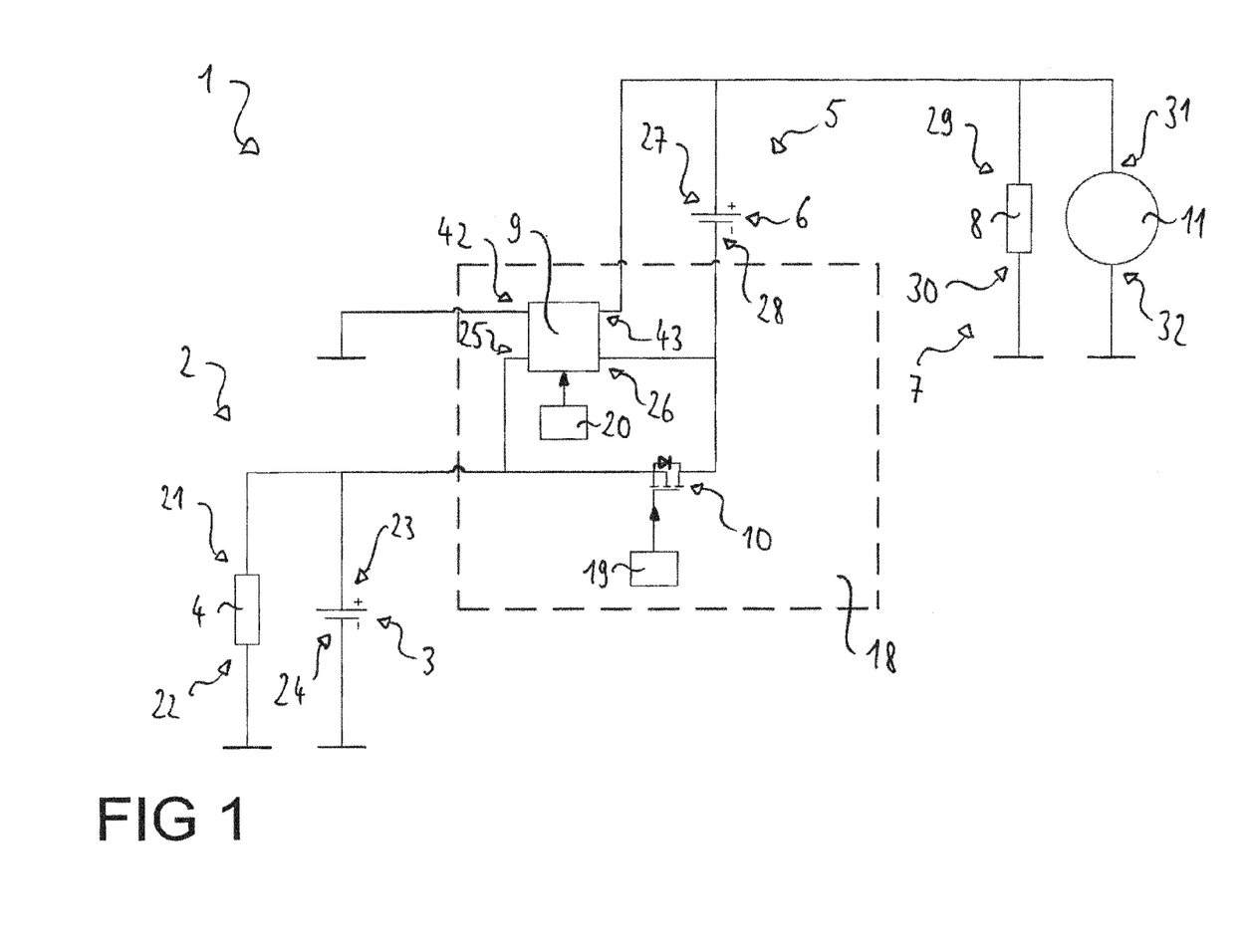
FIG. 1 shows a block diagram of an on-board power system according to a first embodiment of the application.

FIG. 1 shows a block diagram of an on-board power system 1 of a vehicle (not illustrated in any more detail) according to a first embodiment of the application. The on-board power system 1 may be, for example, part of a motor vehicle, in particular an automobile or a truck.

The on-board power system 1 has a first on-board power system branch 2 having a first operating voltage $U_1$, the first operating voltage $U_1$ being 12 V in the embodiment shown. The first on-board power system branch 2 has a first electrical energy store 3, for example in the form of a 12 V rechargeable battery, in particular a 12 V Li ion rechargeable battery. The first on-board power system branch 2 also has a first electrical load 4 which forms a dynamic load. The first electrical load 4 may be, in particular, in the form of a starter of an internal combustion engine (not illustrated in any more detail) of the vehicle.

The on-board power system 1 also has a second on-board power system branch 5 having a second operating voltage $U_2$. The second operating voltage $U_2$ is 36 V in the embodiment shown. A second electrical energy store 6 which is in the form of a 36 V Li ion rechargeable battery or a 36 V double-layer capacitor arrangement, for example, is arranged in the second on-board power system branch 5.

The on-board power system 1 also has a third on-board power system branch 7 having a third operating voltage $U_3$. In the embodiment shown, the third on-board power system branch 7 has a third electrical load 8 and an electrical machine 11 of the vehicle. The electrical machine 11 has a plurality of operating states, said machine forming a starter generator or an electric motor of the vehicle, depending on the operating state. Depending on the operating state, the electrical machine 11 can therefore provide a variable torque or can produce electrical energy or can act as a drive assembly of the vehicle. In this case, the operating state of the electrical machine 11 is set using a control unit (not illustrated in any more detail).

The on-board power system 1 also has a DC/DC converter 9. The DC/DC converter 9 is in the form of a bidirectional DC/DC converter which can convert a first voltage into a second voltage and vice versa, in particular. For this purpose, the DC/DC converter 9 is in the form of a synchronous converter for bidirectionally transmitting energy in the embodiment shown.

The on-board power system 1 also has a first switching apparatus 10. In the embodiment shown, the first switching apparatus 10 is designed as a semiconductor switch in the form of a normally off n-channel MOSFET switch.

The first energy store 3 and the second energy store 6 can be electrically connected in series with one another via the first switching apparatus 10 in such a manner that the third operating voltage $U_3$ can be provided by the first operating voltage $U_1$ and the second operating voltage $U_2$ together. In the embodiment shown, a third operating voltage $U_3$ of 48 V can therefore be provided in the third on-board power system branch 7 by connecting the first energy store 3 and the second energy store 6 in series.

In the embodiment shown, the first switching apparatus 10 is connected in this case to the positive path of the first on-board power system branch 2 on the source side and to the negative path of the second on-board power system branch 5 on the drain side. A first connection 23 of the first electrical energy store 3, which forms a positive pole, can thereby be electrically coupled, via the first switching apparatus 10, to a second connection 28 of the second electrical energy store 6, which forms a negative pole.

In this case, the first connection 23 of the first electrical energy store 3 is connected to the second connection 28 of the second electrical energy store 6 in a first switching position of the first switching apparatus 10, in which the first switching apparatus 10 is closed. The first connection 23 of the first electrical energy store 3 is electrically disconnected from the second connection 28 of the second electrical energy store 6 in a second switching position of the first switching apparatus 10, in which the latter is open.

A second connection 24 of the first electrical energy store 3, which forms a negative pole, is electrically coupled to a reference potential. Furthermore, a first connection 27 of the second electrical energy store 6, which forms a positive pole, is coupled to the third on-board power system branch 7.

On the source side, the first switching apparatus 10 is also connected to a first connection 21 of the first electrical load 4 and to a first connection 25 of the DC/DC converter 9, which is arranged on a primary side of the DC/DC converter 9. On the drain side, the first switching apparatus 10 is also connected to a second connection 26 of the DC/DC converter 9, which is arranged on a secondary side of the DC/DC converter 9. The second connection 26 is also connected to the second connection 28 of the second electrical energy store 6. The first connection 25 is also connected to the first connection 23 of the first electrical energy store 3 and to the first connection 21 of the first electrical load 4.

In addition, the DC/DC converter 9 has, on the primary side, a third connection 42 which is electrically coupled to the reference potential. On the secondary side, the DC/DC converter 9 also has a fourth connection 43 which is concomitantly connected to the first connection 27 of the second electrical energy store 6 and to a first connection 29 of the third electrical load 8 and to a first connection 31 of the electrical machine 11. The first connection 27 of the second electrical energy store 6 is likewise connected to the first connection 29 of the third electrical load 8 and to the first connection 31 of the electrical machine 11.

A second connection 22 of the first electrical load 4, a second connection 30 of the third electrical load 8 and a second connection 32 of the electrical machine 11 are electrically coupled to the reference potential.

The on-board power system 1 also has a first drive unit 19 which is designed to drive the first switching apparatus 10. The first switching apparatus 10 is closed and opened using the drive unit 19, that is to say a corresponding voltage, for which an electrically conductive channel is formed or omitted, is applied to the gate of the n-channel MOSFET for this purpose in the embodiment shown. The on-board power system 1 also has a third drive unit 20 which is designed to drive the DC/DC converter 9. The direction of energy transmission between the on-board power system branches 2, 5 and 7 via the DC/DC converter 9, in particular, can be stipulated using the third drive unit 20. The control mode of the DC/DC converter 9 can also be stipulated thereby, that is to say it is possible to determine whether the DC/DC converter 9 is operated in a voltage-controlled, current-controlled or power-controlled manner.

In this case, the first drive unit 19 and the third drive unit 20 are coupled to further vehicle components (not illustrated in any more detail), in particular further control units of the vehicle, in order to generate drive signals for driving the first switching apparatus 10 and the DC/DC converter 9 on the basis of a respective operating state of the vehicle.

In the embodiment shown, the DC/DC converter 9, the first switching apparatus 10, the first drive unit 19 and the third drive unit 20 are part of a control unit 18 (CU).

In the embodiment shown, the first connection 23 of the first electrical energy store 3 forms a pole I of a quadripole. A pole II of the quadripole is formed on the drain side of the first switching apparatus 10. The second connection 28 of the second electrical energy store 6 forms a pole III and the first connection 27 of the second electrical energy store 6 forms a pole IV of the quadripole.

Figure 2:
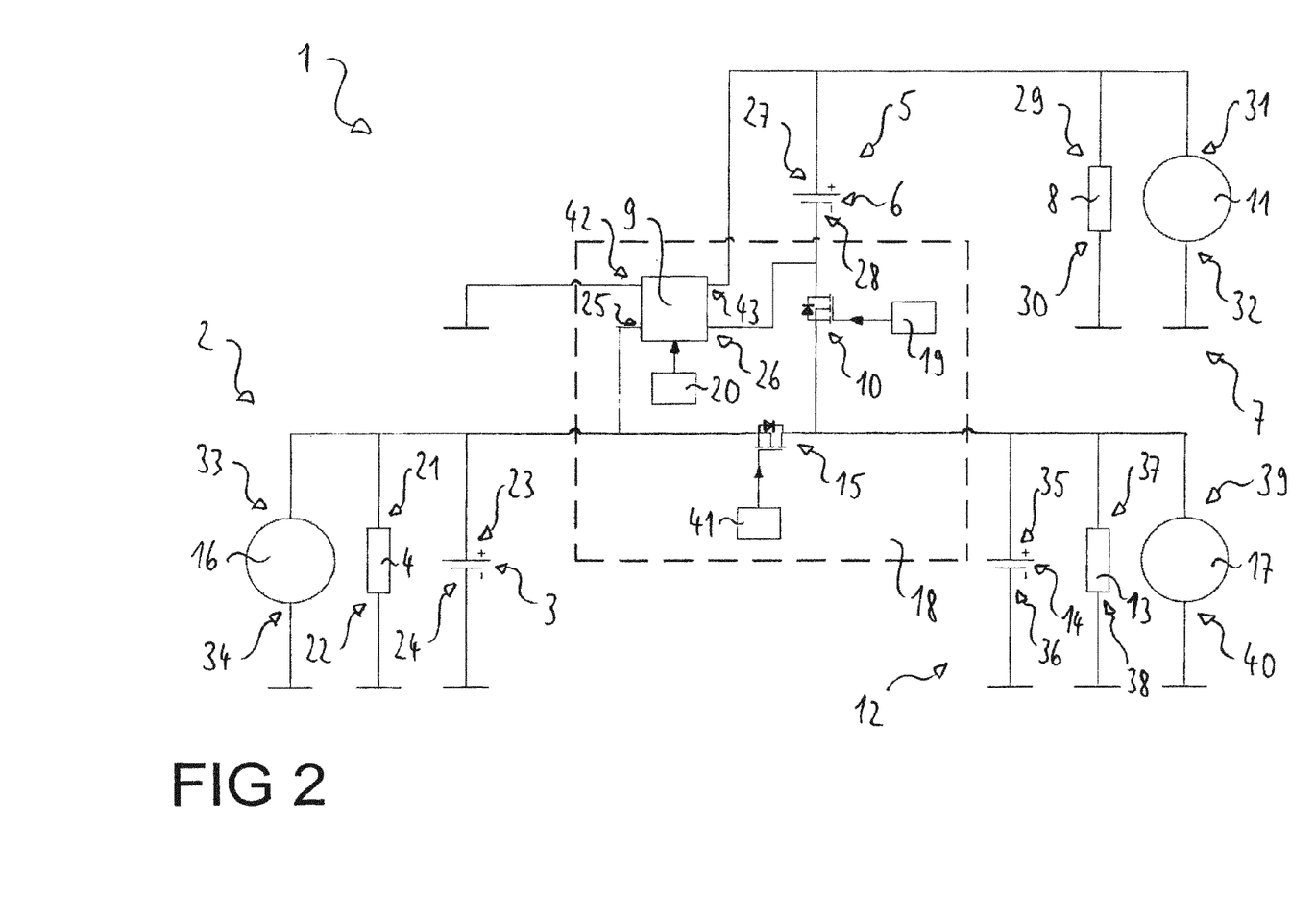
FIG. 2 shows a block diagram of an on-board power system according to a second embodiment of the application.

FIG. 2 shows a block diagram of an on-board power system 1 of a vehicle (not illustrated in any more detail) according to a second embodiment of the application. Components having the same functions as in FIG. 1 are identified using the same reference symbols and are not explained again below.

In the embodiment shown, in addition to the first on-board power system branch 2, the second on-board power system branch 5 and the third on-board power system branch 7, the on-board power system 1 has a fourth on-board power system branch 12 having a fourth operating voltage $U_4$. In the embodiment shown, the fourth operating voltage $U_4$ is 12 V, that is to say the first on-board power system branch 2 and the fourth on-board power system branch 12 have the same nominal voltage in the embodiment shown.

The fourth on-board power system branch 12 has a fourth electrical load 13 and a third electrical energy store 14. A generator 17 is also arranged in the fourth on-board power system branch 12.

The on-board power system 1 also has a second switching apparatus 15 which, in the embodiment shown, is designed as a semiconductor switch in the form of a normally off n-channel MOSFET switch.

The first on-board power system branch 2 and the fourth on-board power system branch 12 can be electrically coupled via the second switching apparatus 15. For this purpose, the second switching apparatus 15 is connected to the first on-board power system branch 2 on the source side and to the fourth on-board power system branch 12 on the drain side. In particular, the second switching apparatus 15 is connected, on the drain side, to a first connection 35 of the third energy store 14, to a first connection 37 of the fourth electrical load 13 and to a first connection 39 of the generator 17. A second connection 36 of the third energy store 14, a second connection 38 of the fourth electrical load 13 and a second connection 40 of the generator 17 are electrically coupled to the reference potential.

The on-board power system 1 also has a second drive unit 41 which is designed to drive the second switching apparatus 15. The second switching apparatus 15 is opened and closed using the second drive unit 41. In this case, the first on-board power system branch 2 is electrically coupled to the fourth on-board power system branch 12 in a first switching position of the second switching apparatus 15, in which the latter is closed. The first on-board power system branch 2 is electrically disconnected from the fourth on-board power system branch 12 in a second switching position of the second switching apparatus 15, in which the latter is open.

The second switching apparatus 15 is also connected to the source side of the first switching apparatus 10 on the drain side. In the embodiment shown, the first energy store 3 and the second energy store 6 can therefore be electrically connected in series with one another via the first switching apparatus 10 and via the second switching apparatus 15.

In the embodiment shown, the on-board power system 1 also has a starter 16 of an internal combustion engine (not illustrated in any more detail) of the vehicle, the starter 16 being arranged in the first on-board power system branch 2. The starter 16 has a first connection 33 which is electrically coupled, in particular, to the source side of the second switching apparatus 15. The starter 16 also has a second connection 34 which is electrically coupled to the reference potential.

In the embodiment shown, the DC/DC converter 9, the first switching apparatus 10, the second switching apparatus 15, the first drive unit 19, the second drive unit 41 and the third drive unit 20 are part of the control unit 18. In another refinement, said components are arranged in a manner distributed over the on-board power system 1.

In the embodiment shown in FIG. 2, the third energy store 14 and the second energy store 6 are connected in a switchable manner via the first switching apparatus 10. The first energy store 3 and the third energy store 14 are also connected in a switchable manner via the second switching apparatus 15. In this case, an advantage can be seen in the geometrical arrangement of the second energy store 6 and the third energy store 14. In the topology shown, only the first switching apparatus 10 is arranged in the path between the second energy store 6 and the third energy store 14.

A suitable ratio of the charge of the third energy store 14 to that of the second energy store 6 is typically ⅓, the charge in the third energy store 14 together with the charge in the second energy store 6 amounting to 100 percent. In this case, the second energy store 6 and the third energy store 14 may be formed in a common unit with four connections.

Another advantage can also be seen in the geometrical arrangement of the first energy store 3 and the third energy store 14.

In this case, only the second switching apparatus 15 is arranged in the path between the first energy store 3 and the third energy store 14. A suitable ratio between the charge of the third energy store 14 and that of the first energy store 3 is typically ⅓ or lower, the charge in the third energy store 14 together with the charge in the first energy store 3 amounting to 100 percent. The first energy store 3 and the third energy store 14 may be formed in a common unit with three connections.

The first connection 23 of the first electrical energy store 3 forms a pole I of a quadripole in the embodiment shown. A pole II of the quadripole is formed on the drain side of the second switching apparatus 15. The second connection 28 of the second electrical energy store 6 forms a pole III and the first connection 27 of the second electrical energy store 6 forms a pole IV of the quadripole.

Figure 3:
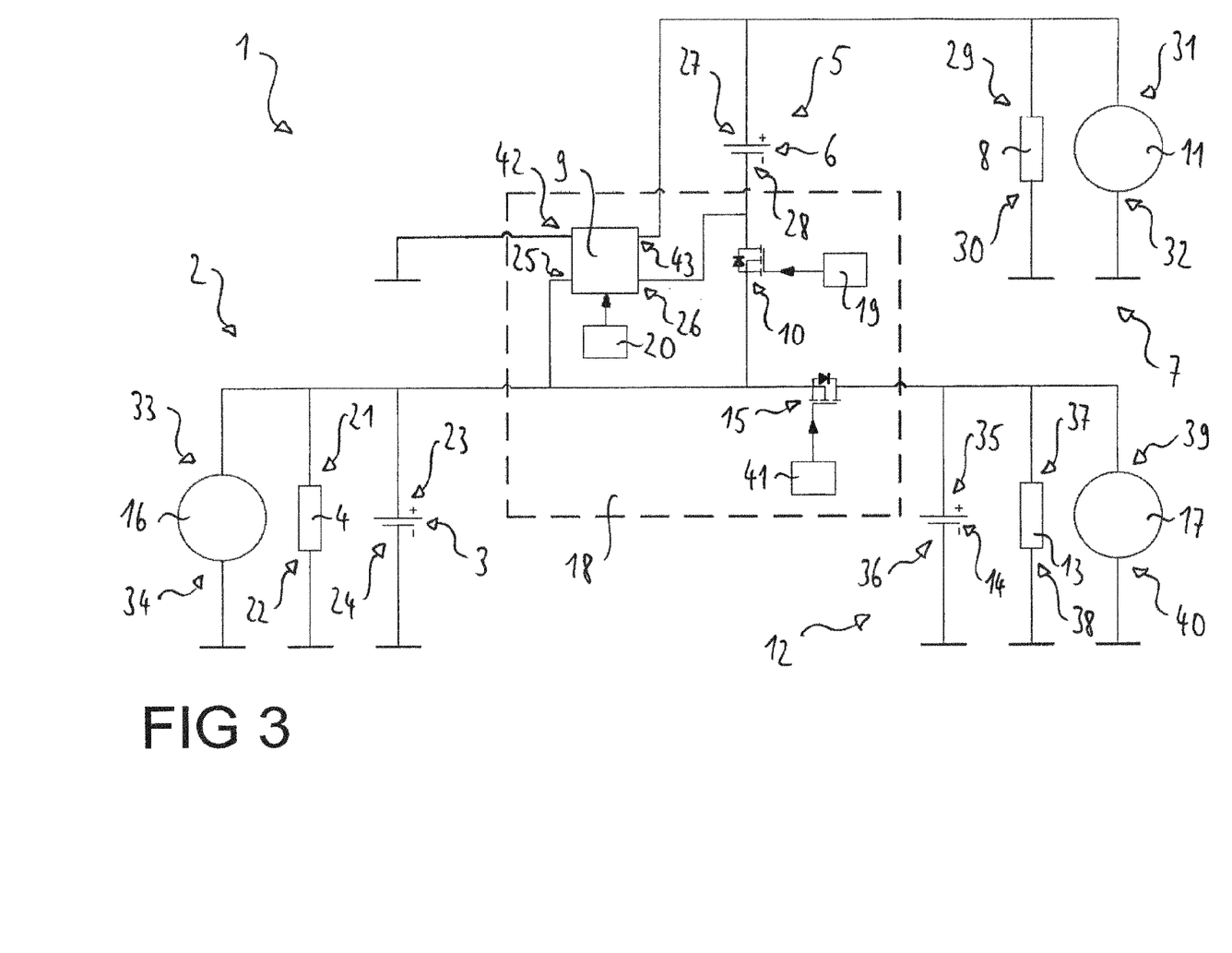
FIG. 3 shows a block diagram of an on-board power system according to a third embodiment of the application.

FIG. 3 shows a block diagram of an on-board power system 1 of a vehicle (not illustrated in any more detail) according to a third embodiment of the application. Components having the same functions as in FIGS. 1 and 2 are identified using the same reference symbols and are not explained again below.

The third embodiment shown in FIG. 3 differs from the second embodiment shown in FIG. 2 in that the second switching apparatus 15 is connected to the source side of the first switching apparatus 10 on the source side. In the third embodiment shown, the first energy store 3 and the second energy store 6 can therefore be electrically connected in series with one another only via the first switching apparatus 10.

In addition to the electrical loads shown in FIGS. 1 to 3, the first on-board power system branch 2, the second on-board power system branch 5, the third on-board power system branch 7 and/or the fourth on-board power system branch 12 may also have further electrical loads, that is to say the first on-board power system branch 2, the second on-board power system branch 5, the third on-board power system branch 7 and the fourth on-board power system branch 12 may each have at least one electrical load, the second on-board power system branch 5 not having an electrical load in the embodiments shown.

The on-board power system topology shown in FIGS. 1 to 3 may also be referred to as MCP (Multi Combined Powernet) and is a combination of at least two subnetworks A and B in the form of the first on-board power system branch 2 and the second on-board power system branch 5. In the embodiments shown, the network A has a nominal voltage of 12 V and the network B has a nominal voltage of 36 V. An expansion of the subnetworks is achieved in this case by virtue of the fact that the on-board power system A can be connected in series with the additional network B. The switching operation is controlled by the control unit 18. The consequence of the series circuit of the networks A and B is the configuration of a new network C in the form of the third on-board power system branch 7 having a nominal voltage level of 48 V in the embodiments shown. The MCP topology shown is used, for example, in a vehicle with possible electric operation, in particular electric driving, for example a micro-hybrid or mild hybrid electric vehicle. In this case, at least one electrical voltage converter, load, drive and generator and two electrical energy stores are typically used in each case.

In the topology depicted in FIG. 3, the first on-board power system branch 2, which is also referred to as energy system Esys1, comprises an energy store, which is in the form of a 12-volt Li battery for example, and at least one dynamic load, for example the starter. The second on-board power system branch 5, which is also referred to as energy system Esys2, comprises an energy store which is in the form of a 36-volt Li battery, for example. In the embodiment shown, the fourth on-board power system branch 12, which is also referred to as energy system Esys3, comprises the optionally present third energy store 14, which is in the form of a 12-volt Li battery for example, the optionally present generator 17 and at least one dynamic load. The electrical machine 11, which can form a starter generator or an electrical drive machine of the vehicle, is part of the independent third on-board power system branch 7 which is also referred to as energy system Esys4. Esys4 also contains at least one dynamic load.

In this case, the electrical machine 11 and the generator 17 may be implemented in one unit. In this refinement, the generator 17 is a corresponding voltage tap inside the electrical machine 11. The use of the generator 17 inside Esys3 or alternatively Esys1 increases the redundancy and availability of the system.

Furthermore, the first energy store 3 and the second energy store 6 may be implemented in a device unit. In this case, the first energy store 3 can be reached via two voltage taps inside the common device unit. The first energy store 3 and the second energy store 6 may be formed in a common unit with four connections.

Furthermore, the first energy store 3 and the third energy store 14 may be implemented in a device unit. In this case, the third energy store 14 is a voltage tap inside the common device unit. In this refinement, the first energy store 3 and the third energy store 14 are formed in a common unit with three connections.

In addition, the second energy store 6 and the third energy store 14 may be implemented in a device unit. In this case, the third energy store 14 can be reached via two voltage taps inside the common device unit. In this refinement, the second energy store 6 and the third energy store 14 are formed in a common unit with four connections.

The storage capacity for electrical charge of the first electrical energy store 3 is preferably considerably greater than the charge of the second electrical energy store 6 and of the third electrical energy store 14. As a result of these refinements, the energy system Esys1 dominates and remains conservatively prioritized within the topology. This design of the first energy store 3 increases the redundancy and availability and the voltage stability of the system.

Furthermore, the non-reactive internal resistance of the first energy storage apparatus 3 may be designed to be as small as possible, for example approximately 5 mΩ or less. As a result, the voltage dip inside Esys1 is minimized if the engine of the vehicle is started using the starter 16, for example in the form of a pinion starter. The use of the starter 16 increases the redundancy and availability of the system. A very small internal resistance in the first energy store 3 possibly makes it possible to dispense with the third energy store 14 and the second switching apparatus 15.

For reliable generator operation with the starter generator, the latter is coupled to the energy stores from Esys1 or Esys3 and Esys2 since otherwise there is the possibility of on-board power system collapse in Esys4. In this case, the dynamic load, that is to say the third electrical load 8, would require more energy than can be provided by the starter generator. The first switching apparatus 10 is closed in order to electrically connect to the second energy store 6 with the series connection to the first energy store 3.

The body diode which is likewise present in the embodiment shown in the first switching apparatus 10, which is in the form of an NMOS transistor, can allow the current to flow through the diode in the direction of the third electrical load 8 and can therefore support the network C. In this case, the first switching apparatus 10 may possibly be open.

Instead of or in proportion to the second energy store 6, an electrical connection can be established from network A to network B using the DC/DC converter 9. For this purpose, the DC/DC converter transports energy from Esys1 to Esys2. The network C can therefore obtain energy from network A and network B.

Irrespective of the switch state of the first switching apparatus 10, energy can be transported from Esys2 to Esys1 via the DC/DC converter 9. This is the case, for example, if the high-current load in the form of the first electrical load 4 and the starter 16 arranged in Esys1 result in a voltage dip in Esys1 and Esys3 when the engine is started.

This supply of energy by the DC/DC converter 9 may be lower if an additional switch in the form of the second switching apparatus 15 disconnects the system Esys3 from Esys1. Irrespective of the state of charge of the first energy store 3, the optionally used third energy store 14 provides energy for sensitive loads, that is to say the fourth electrical load 13 in the embodiment shown. The second switching apparatus 15 can be opened in the event of critical voltage dips inside Esys1. In this case, the fourth electrical load 13 remains with a substantially constant supply via the third electrical energy store 14. The optionally used generator 17 inside Esys3 is additionally used. Said generator can supply the third electrical energy store 14 with electrical charge when the second switching apparatus 15 is closed.

In particular, the topology shown in FIG. 3 is able to organize redundant energy flows, as explained below.

The network A and the first electrical energy store 3 can be charged by the starter generator in network C, in which case the first switching apparatus 10 is closed and the second switching apparatus 15 may be open or closed.

Network A and the first energy store 3 can also be charged by the DC/DC converter 9, in which case the first switching apparatus 10 is open or closed and the second switching apparatus 15 is open or closed.

Network A and the first energy store 3 can also be charged by the generator 17, in which case the first switching apparatus 10 is open or closed and the second switching apparatus 15 is closed.

Network B and the second energy store 6 can be charged by the starter generator, in which case the first switching apparatus 10 is closed and the second switching apparatus 15 is open or closed.

Network B and the second energy store 6 can also be charged by the DC/DC converter 9, in which case the first switching apparatus 10 is open or closed and the second switching apparatus 15 is open or closed.

Network C and the third electrical load 8 can be supplied by the starter generator, in which case the first switching apparatus 10 is open or closed and the second switching apparatus 15 is open or closed.

Furthermore, network C and the third electrical load 8 can be supplied by the DC/DC converter 9, in which case the first switching apparatus 10 is closed or open and the second switching apparatus 15 is open or closed.

The fourth on-board power system branch 12, which is also referred to as network A* or A#, and the third energy store 14 can be charged by the generator 17, in which case the first switching apparatus 10 is open or closed and the second switching apparatus 15 is open or closed.

Network A* and the third energy store 14 can also be charged by the first energy store 3, in which case the first switching apparatus 10 is open or closed and the second switching apparatus 15 is closed.

When the ideal second switching apparatus 15 is closed, the networks A and A* are substantially identical with respect to the voltage.

The above energy flow description enables triple redundancy of the network A and therefore illustrates its system priority from the point of view of functional availability and functional reliability.

The control unit 18 controls or regulates the energy flows inside the system. The nominal voltage states aimed for in the networks A, A*, B and C are set and controlled by determining system and vehicle states.

In this case, important advantages result from the series connection of Esys1 and Esys2. As a result, it is also possible to dispense with Li ion cells, for example, in a minimal system configuration, as illustrated in FIG. 1, which results in a cost advantage.

The redundancy behavior of the arrangement is also advantageous. If Esys2 and/or the DC/DC converter 9 fail(s), the system runs in a backup mode. The prioritized system Esys1 and possibly Esys3 is/are retained without restriction, which is advantageous with regard to functional reliability.

The possibility of using two redundant generators and two redundant starters is also advantageous with regard to availability.

When the third energy store 14 is used, the advantage of voltage stabilization is produced in the network A* in which sensitive loads can be operated, which in turn enables an availability advantage.

When the first energy store 3 is used, the advantage of recuperation is produced in network A, with which the flexible energy flow can be supported and with which an availability advantage is again associated.

When the third energy store 14 is used, the advantage of recuperation is produced in network A*, with which the flexible energy flow can be supported again and with which an availability advantage is associated.

When the second energy store 6 is used, the advantage of recuperation is produced in network C, with which a flexible energy flow can be supported again and with which an availability advantage is associated.

Another advantage of the series connection of Esys1 and Esys2 in the on-board power system topologies shown is provided in the event of a short circuit from network C to network A or A*. In this case, overcharging in the 12-volt network, that is to say the network A or network A*, can be advantageously avoided, in particular if the engine speed is zero. The short circuit takes place only inside Esys2. The resultant high current flow can be temporally limited via a fuse and/or a relay inside this network path, for example by opening the relay.

Furthermore, non-critical overcharging of Esys1 or Esys3 in the event of this short circuit can also be achieved in the case of engine speeds which are different from zero. For this purpose, the internal resistance of the first energy store 3 should be designed to be considerably smaller than that of the electrical machine 11. As a result, the voltage in network A or A* is initially only slightly raised and can be permanently held at non-critical values via a short-circuit detection mechanism inside the electrical machine 11, that is to say the electrical machine 11 stops the energy flow to Esys1 or Esys3 in order to prevent greater system damage in the on-board power system 1. Furthermore, the DC/DC converter 9 can be activated in such a manner that the short-circuit energy is at least partially transported back into Esys2 or Esys3. Overcharging protection for the third energy store can also be provided if the first switching apparatus 10 is opened and the DC/DC converter 9 is deactivated in this case and overcharging protection for the third energy store is provided in such a manner that the charging current of the generator is limited.

Furthermore, topologies with potential isolation using the MCP topology can also be provided. In addition, switch arrangements are also possible in the ground path, that is to say the corresponding on-board power system components shown in FIGS. 1 to 3 may be arranged in the ground or negative path. Furthermore, fuses and/or further switches may be used in the paths of the first energy store 3, the second energy store 6 and/or the third energy store 14 in order to provide further system protection against overcharging and short circuits.

Cost advantages therefore result from reducing the number of Li ion cells, for example, in order to achieve the voltage level of 48 V, for example, from reducing the spatial volume in order to achieve the voltage level of 48 V, for example, and from reducing the weight in order to achieve the voltage level of 48 V, for example.

As an alternative to a parallel connection of Esys1 and Esys3, a series connection of Esys1 and Esys3 is also possible. In addition, a stable voltage level in the 12-volt network for operating sensitive loads independently of the 48-volt network and independently of an engine start or the respective vehicle state is advantageously enabled. The availability and functional reliability are increased as a result of a redundant starter design and/or a redundant generator design in the 12-volt network and 48-volt network. There is also a cost advantage from the possibility of optimum system matching with the starter, generator, the respective energy stores and the respective electrical loads. Furthermore, it is possible to control arbitrary short circuits between the 48-volt network and the 12-volt network both at an engine speed of zero and at engine speeds not equal to zero if the system-relevant impedances are considered.

Figure 4:
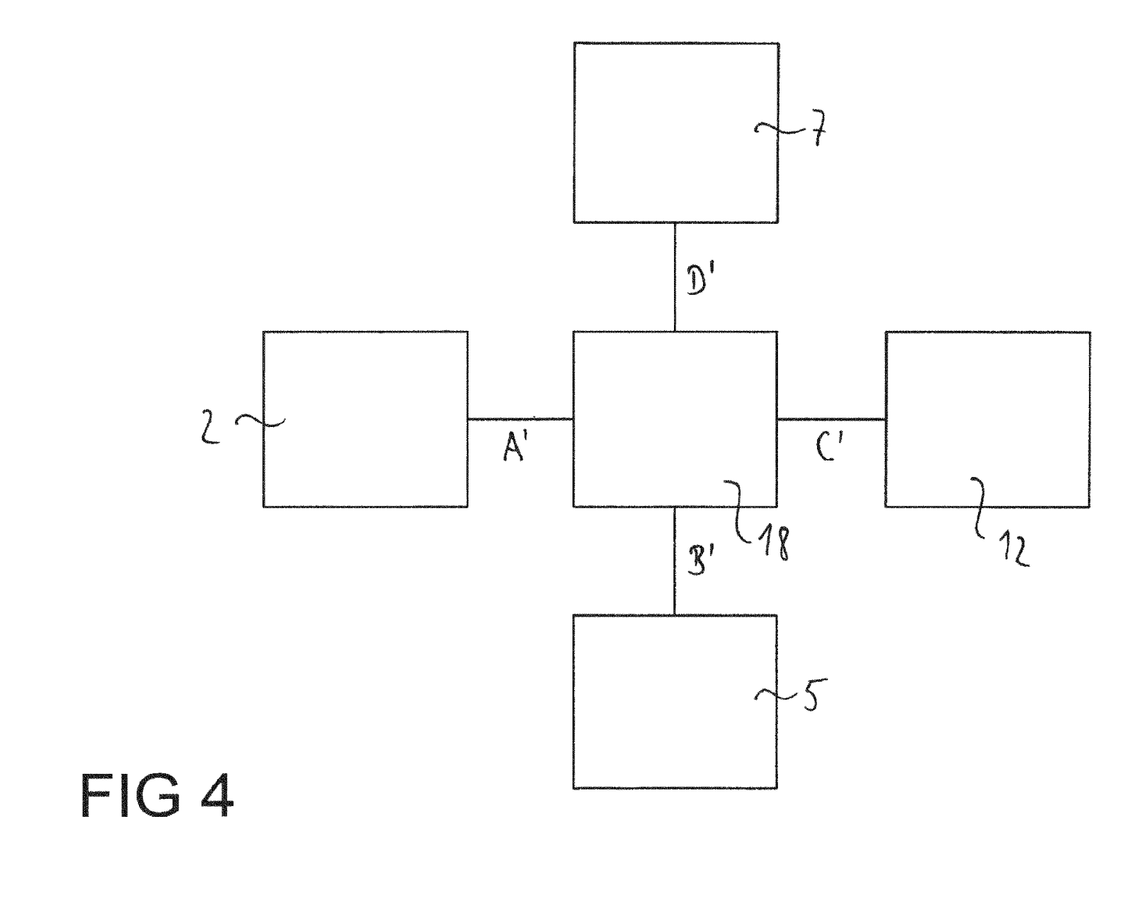
FIG. 4 shows a basic circuit diagram of on-board power systems according to the application.

FIG. 4 shows a basic circuit diagram of on-board power systems according to the application. Components having the same functions as in the preceding figures are identified using the same reference symbols and are not explained again below.

As schematically illustrated in FIG. 4, energy can be interchanged between the first on-board power system branch 2, which forms a first energy system Esys1, the second on-board power system branch 5, which forms a second energy system Esys2, the third on-board power system branch 7, which forms a fourth energy system Esys4, and the fourth on-board power system branch 12, which forms a third energy system Esys3, using the control unit 18. The control unit 18 connects the four energy systems Esys1, Esys2, Esys3 and Esys4 to one another and therefore makes it possible to interchange energy between the four systems. The transmission of energy between the first on-board power system branch 2, the second on-board power system branch 5, the third on-board power system branch 7, the fourth on-board power system branch 12 and the control unit 18 is schematically illustrated in FIG. 4 in this case using couplings A', B', C' and D'.

LIST OF REFERENCE SYMBOLS

1 On-board power system
2 On-board power system branch
3 Energy store
4 Load
5 On-board power system branch
6 Energy store
7 On-board power system branch
8 Load
9 DC/DC converter
10 Switching apparatus
11 Electrical machine
12 On-board power system branch
13 Load
14 Energy store
15 Switching apparatus
16 Starter
17 Generator
18 Control unit
19 Drive unit
20 Drive unit
21 Connection
22 Connection
23 Connection
24 Connection
25 Connection
26 Connection
27 Connection
28 Connection
29 Connection
30 Connection
31 Connection
32 Connection
33 Connection
34 Connection
35 Connection
36 Connection
37 Connection
38 Connection
39 Connection
40 Connection
41 Drive unit
42 Connection 43 Connection
A' Coupling
B' Coupling
C' Coupling
D' Coupling

What is claimed is:

1. An on-board power system for a vehicle, comprising:
a first on-board power system branch having a first operating voltage $U_1$, a first energy store, and a first electrical load,
a second on-board power system branch having a second operating voltage $U_2$ and a second energy store,
a third on-board power system branch having a third operating voltage $U_3$ and a third electrical load,
a fourth on-board power system branch having a fourth operating voltage $U_4$ and a fourth electrical load,
a DC/DC converter configured to bidirectionally transmit energy at least between the first on-board power system branch and the second on-board power system branch, and
a first switching apparatus configured to selectively connect the first energy store and the second energy store in series with one another such that the third operating voltage $U_3$ can be provided by the first operating voltage $U_1$ and the second operating voltage $U_2$ together, and
a second switching apparatus configured to selective connect the first on-board power system branch to the fourth on-board power system branch.

2. The on-board power system of claim 1, wherein $U_2 > U_1$.

3. The on-board power system of claim 1, wherein the third on-board power system branch further comprises an electrical machine.

4. The on-board power system of claim 1, wherein the fourth on-board power system branch further comprises a third energy store.

5. The on-board power system of claim 1, wherein the first switching apparatus and via the second switching apparatus are configured to selective connect the first energy store and the second energy store in series with one another.

6. The on-board power system of claim 1, wherein the first on-board power system branch further comprises a starter of an internal combustion engine of the vehicle, and
wherein the fourth on-board power system branch further comprises a generator.

7. The on-board power system of claim 1, wherein the first energy store, the second energy store, the third energy store, the DC/DC converter, the first switching apparatus, and the second switching apparatus are components of a control unit.

8. The on-board power system of claim 1, wherein at least one of the first switching apparatus and the second switching apparatus is selected from the group consisting of a relay and a semiconductor switch.

9. The on-board power system of claim 4, wherein the first energy store and the third energy store comprise a common device unit, wherein the third energy store is contactable via a voltage tap inside the first energy store.

10. The on-board power system of claim 6, wherein the generator and the electrical machine comprise a common device unit, wherein the generator is contactable via a voltage tap of the electrical machine.

11. A hybrid electric vehicle, comprising:
an on-board power system comprising:
a first on-board power system branch having a first operating voltage $U_1$, a first energy store, and a first electrical load,
a second on-board power system branch having a second operating voltage $U_2$ and a second energy store,
a third on-board power system branch having a third operating voltage $U_3$ and a third electrical load,
a fourth on-board power system branch having a fourth operating voltage $U_4$ and a fourth electrical load,
a DC/DC converter configured to bidirectionally transmit energy at least between the first on-board power system branch and the second on-board power system branch, and
a first switching apparatus configured to selectively connect the first energy store and the second energy store in series with one another such that the third operating voltage $U_3$ can be provided by the first operating voltage $U_1$ and the second operating voltage $U_2$ together, and
a second switching apparatus configured to selective connect the first on-board power system branch to the fourth on-board power system branch.

12. The hybrid electric vehicle of claim 11, wherein $U_2 > U_1$.

13. The hybrid electric vehicle of claim 11, wherein the third on-board power system branch of the on-board power system further comprises an electrical machine.

14. The hybrid electric vehicle of claim 11, wherein the fourth on-board power system branch of the on-board power system further comprises a third energy store.

\* \* \* \* \*